United States Patent
Mahajan et al.

(10) Patent No.: US 8,762,341 B1
(45) Date of Patent: Jun. 24, 2014

(54) EFFICIENTLY CONFIGURING MULTIPLE BACKUP DATA POLICIES WITH INFORMATION SPECIFYING DATA TO BACKUP

(75) Inventors: Sameer Mahajan, Pune (IN); Dulipsinh Hanamant Deshmukh, Pune (IN); Pradip Kulkarni, Pune (IN); Nitin Anand, Pune (IN)

(73) Assignee: Symantec Corporation, Mountain View, CA (US)

( * ) Notice: Subject to any disclaimer, the term of this patent is extended or adjusted under 35 U.S.C. 154(b) by 172 days.

(21) Appl. No.: 13/335,010

(22) Filed: Dec. 22, 2011

(51) Int. Cl.
G06F 17/30 (2006.01)

(52) U.S. Cl.
USPC .......................... 707/648; 707/640; 707/654

(58) Field of Classification Search
USPC .......................... 707/640, 648, 654
See application file for complete search history.

(56) References Cited

U.S. PATENT DOCUMENTS

| | | | |
|---|---|---|---|
| 5,659,614 A * | 8/1997 | Bailey, III | 713/165 |
| 7,395,378 B1 * | 7/2008 | Pendharkar et al. | 711/144 |
| 7,509,468 B1 * | 3/2009 | Dalal et al. | 711/163 |
| 7,636,736 B1 * | 12/2009 | Kumar et al. | 1/1 |
| 7,774,313 B1 | 8/2010 | Nachenberg | |
| 7,890,469 B1 * | 2/2011 | Maionchi et al. | 707/654 |
| 7,904,679 B2 | 3/2011 | Stager et al. | |
| 7,984,322 B1 | 7/2011 | Feeser et al. | |
| 7,996,361 B1 * | 8/2011 | Shah et al. | 707/626 |
| 8,041,679 B1 * | 10/2011 | Narayanan | 707/645 |
| 8,244,678 B1 | 8/2012 | Hartland et al. | |
| 8,301,772 B2 | 10/2012 | Zeis et al. | |
| 8,352,434 B2 | 1/2013 | Derk et al. | |
| 2005/0203908 A1 * | 9/2005 | Lam et al. | 707/10 |
| 2010/0223274 A1 * | 9/2010 | DeHaan et al. | 707/758 |
| 2010/0274768 A1 * | 10/2010 | Wang et al. | 707/676 |
| 2011/0295802 A1 * | 12/2011 | Parham et al. | 707/625 |
| 2013/0054639 A1 * | 2/2013 | Sharma et al. | 707/770 |

OTHER PUBLICATIONS

Article entitled "VxFS file change log for incremental backups property on UNIX/Linux" by Symantec, dated Mar. 10, 2011.*
Article entitled "Symantec NetBackup 7.5 Beta Primer" by Symantec, dated Oct. 26, 2011.*
Article entitled "NBU 7.5 Beta 2—now available", by Bliss, dated Oct. 26, 2011.*
Article entitled "How to redirect NetBackup Accelerator track log to a different location" by Symantec, dated Aug. 10, 2012.*
Article entitled "Frequently Asked Questions on NetBackup Accelerator" by Rasheed, dated Jan. 22, 2013.*

(Continued)

Primary Examiner — Mahesh Dwivedi
(74) Attorney, Agent, or Firm — Myertons Hood Kivlin Kowert & Goetzel, PC

(57) ABSTRACT

A system and method for determining the data that should be backed up by a plurality of backup policies are described. A global file change log that lists which files have been changed may be maintained. The global file change log may be processed to distribute the file change information into policy-specific file change logs. A global block change bitmap may also be maintained. The global block change bitmap may indicate which data blocks of the files have been changed. Performing a respective backup operation for a respective backup policy may include backing up only the data blocks that have changed in the files listed in the respective policy-specific file change log since a previous backup operation for the respective backup policy was performed. The data blocks that have changed may be specified in a respective policy-specific block change bitmap for the respective backup policy.

16 Claims, 10 Drawing Sheets

(56) References Cited

OTHER PUBLICATIONS

Manual entitled "Symantec NetBackup Administrator's Guide, vol. 1", Copyright 2009.*

Article entitled "Netbackup Accelerators Track Log", by Garrett, dated Dec. 18, 2012.*

* cited by examiner

EFFICIENTLY CONFIGURING MULTIPLE BACKUP DATA POLICIES WITH INFORMATION SPECIFYING DATA TO BACKUP

BACKGROUND OF THE INVENTION

1. Field of the Invention

This invention relates to the field of backup software for backing up computer system data, and more particularly, to a system and method for efficiently configuring a plurality of backup policies with information specifying which data blocks each backup policy should backup.

2. Description of the Related Art

Companies and organizations typically use backup software that executes to backup data from computer systems onto backup storage devices. Preserving backup copies of computer system data can help to protect the data. For example, if a computer system crashes or the data becomes corrupted, the data can be restored from a backup copy. A backup copy can also be used to restore the data to a state as it existed at a previous point in time if necessary.

The backup software may be executable to perform different kinds of backup operations, such as full backups and incremental backups. To perform a full backup, the backup software may store a complete copy of the data on the backup storage device. To perform an incremental backup, the backup software may store only the data that has changed since the previous backup operation was performed. The previous backup operation may be either a full backup or another incremental backup.

SUMMARY

Various embodiments of a system and method for determining the data that should be backed up by a plurality of backup policies are described. According to one embodiment, each respective backup policy of the plurality of backup policies may be configured with information specifying a respective subset of a plurality of files to be backed up. In response to changes to the plurality of files, a global file change log that lists which files of the plurality of files have been changed may be maintained. The global file change log may be processed. Processing the global file change log may include: for each respective backup policy of the plurality of backup policies, determining which particular files of the respective subset of files corresponding to the respective backup policy are listed in the global file change log, and adding the particular files to a respective policy-specific file change log for the respective backup policy. Processing the global file change log may further include clearing the global file change log.

A respective backup operation may be performed for each respective backup policy. Performing the respective backup operation for each respective backup policy may include backing up the files listed in the respective policy-specific file change log for the respective backup policy.

In further embodiments, a global block change bitmap may also be maintained in response to changes to the plurality of files. The global block change bitmap may indicate which data blocks of the plurality of files have been changed. For each respective backup policy of the plurality of backup policies, a respective policy-specific block change bitmap may be updated using the global block change bitmap. Performing the respective backup operation for each respective backup policy may include backing up only the data blocks that have changed in the files listed in the respective policy-specific file change log since a previous backup operation for the respective backup policy was performed. The data blocks that have changed may be specified in the respective policy-specific block change bitmap for the respective backup policy.

BRIEF DESCRIPTION OF THE DRAWINGS

A better understanding can be obtained when the following detailed description is considered in conjunction with the following drawings, in which.

Figure 1:
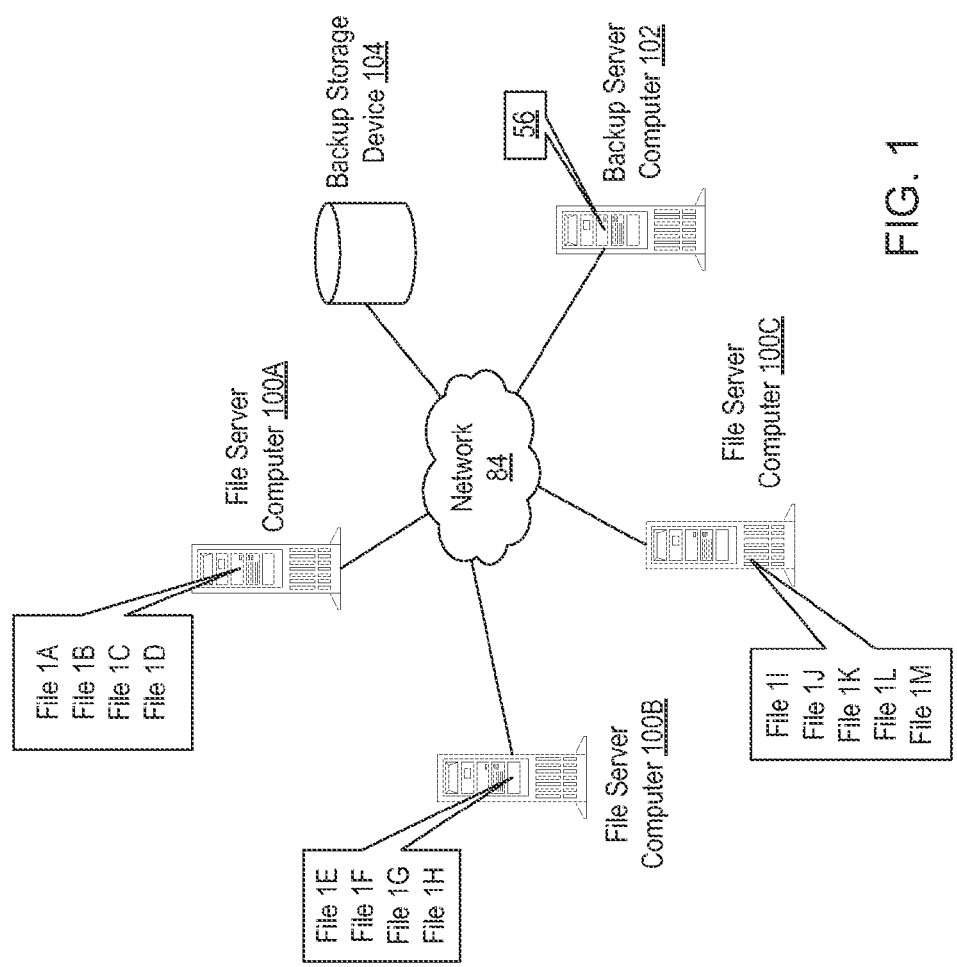
FIG. 1 illustrates an example of a system in which a plurality of files are stored.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates an example of a system in which a plurality of files 1 are stored. For simplicity of the drawing, only a small number of files 1A-1M are illustrated in this example, but in a typical system there may be many more files. In some embodiments the files may be distributed across multiple storage devices, such as storage devices in the file server computers 100A-100C in FIG. 1A. In various embodiments the files may be stored on any number of storage devices. In some embodiments the files may all be stored on the same storage device. Also, the storage devices on which the files are stored may be any kind of devices configured to store data. Examples of storage devices include disk drives, solid state drives, optical drives, tape drives, etc. In the example of FIG. 1A, the storage devices are included in or coupled to the file server computers 100. For example, the file server computers may include disk drives or other storage devices on which the files are stored. In other embodiments the storage devices on which the files are stored may be included in or may be coupled to any of various other kinds of computer systems or devices, such as network-attached storage (NAS) devices, application server computers, etc.

In the example of FIG. 1 the system also includes a backup server computer 102 and backup storage device 104. The backup server computer may execute backup software 56 to backup the files 1 to the backup storage device 104. The backup storage device may be any kind of storage device suitable for storing backup data, such as disk drives, tape drives, optical drives, solid state drives, etc. In various embodiments the system may include any number of backup storage devices.

In some embodiments the backup software 56 executing on the backup server computer may communicate with client backup software on the file server computers 100 to manage backup operations for backing up the files. In other embodiments there may not be a separate backup server computer. For example, the backup software 56 may execute on the file server computers 100 and may communicate directly with the backup storage device 104 to backup the files.

The file server computers 100 may be coupled to each other and to the backup server computer 102 and backup storage device 104 by a network 84. The network 84 may include any type of network or combination of networks. For example, the network may include any type or combination of local area network (LAN), a wide area network (WAN), wireless networks, an Intranet, the Internet, etc. Examples of local area networks include Ethernet networks, Fiber Distributed Data Interface (FDDI) networks, and token ring networks. The devices may each be coupled to the network(s) using any type of wired or wireless connection medium. For example, wired mediums may include Ethernet, fiber channel, a modem connected to plain old telephone service (POTS), etc. Wireless connection mediums may include a wireless connection using a wireless communication protocol such as IEEE 802.11 (wireless Ethernet), a modem link through a cellular service, a satellite link, etc.

Figure 2:
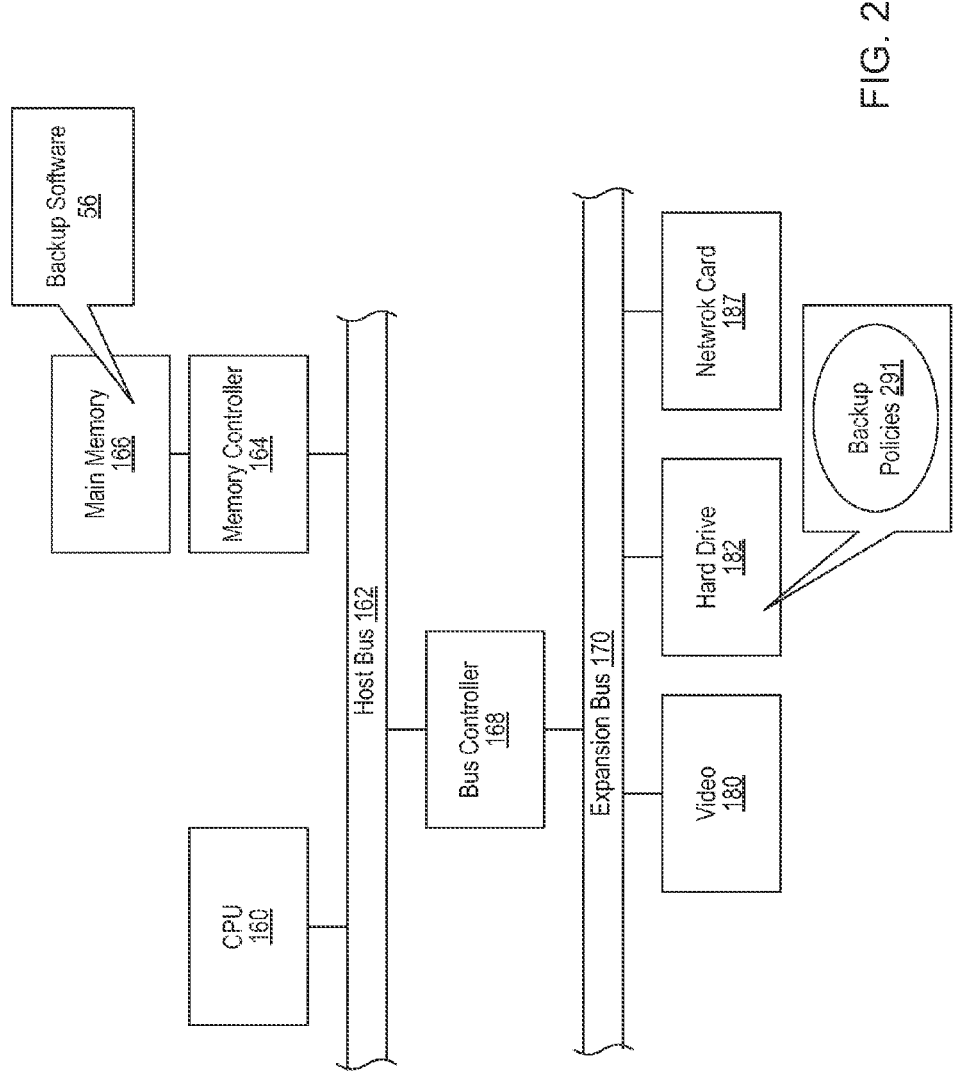
FIG. 2 illustrates an example of a backup server computer configured to execute backup software.

Referring now to FIG. 2, an example of a backup server computer 102 configured to execute the backup software 56 is illustrated. In general the backup software 56 may be executed by any kind of computer system or group of computer systems, such as one or more personal computer systems (PC), workstations, network appliances, distributed computer systems, or other computing devices or combinations of devices. In general, the term "computer system" is broadly defined to encompass any device (or combination of devices) having at least one processor that executes instructions from one or more storage mediums. FIG. 2 illustrates a representative PC embodiment. Elements of a computer not necessary to understand the present description have been omitted for simplicity.

The backup server computer system 102 may include at least one central processing unit or CPU (processor) 160 which is coupled to a processor or host bus 162. The CPU 160 may be any of various types. For example, in some embodiments, the processor 160 may be compatible with the x86 architecture, while in other embodiments the processor 160 may be compatible with the SPARC™ family of processors. Also, in some embodiments the backup server computer system 102 may include multiple processors 160.

The backup server computer system 102 may also include memory 166 in which program instructions implementing the backup software 56 are stored. In some embodiments the memory 166 may include one or more forms of random access memory (RAM) such as dynamic RAM (DRAM) or synchronous DRAM (SDRAM). In other embodiments, the memory 166 may include any other type of memory configured to store program instructions. The memory 166 may also store operating system software or other software used to control the operation of the backup server computer system 102. The memory controller 164 may be configured to control the memory 166.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. Various devices may be coupled to the expansion or input/output bus 170, such as a video display subsystem 180 which sends video signals to a display device, as well as one or more hard disk drives 182 or other storage devices that store information in a non-volatile manner. The backup server computer system 102 may also include a network card or device 187 that enables the backup server computer system 102 to send and receive information over a network.

The backup software 56 may be executable to receive user input specifying a plurality of backup policies 291, and store the backup policies on the hard drive 182, e.g., in the form of one or more files or databases. For example, an administrator of the system may interact with a graphical user interface of the backup software 56 to define each backup policy. In particular, the administrator may configure each backup policy with information specifying a respective subset of the files 1 to be backed up. (As used herein, a subset of a plurality of files is defined as one or more, but not all, of the plurality of files.) The administrator may also specify a backup schedule for the backup policy which specifies when backup operations for the backup policy should be performed. For example, in some embodiments the schedule may specify that backup operations should be initiated for the backup policy at a particular backup frequency, such as every 24 hours, every 12 hours, every 4 hours, etc. The schedule may also be specified using particular times and days, such as every Monday at 2:00 am, every Wednesday at 12:00 am, etc. The user may also define different schedules for different types of backup operations. For example, full backup operations may be scheduled once a week on Sundays, while incremental backup operations may be scheduled for all other days.

When a backup operation for a particular backup policy is performed, the backup operation may operate to backup the respective subset of files corresponding to the backup policy. If the backup operation is a full backup then all the files in the subset of files may be backed up. If the backup operation is an incremental backup then only the files in the subset of files that have been changed since the last (full or incremental) backup operation was performed may be backed up. In some embodiments the backup software may perform incremental backup operations at the block level. Each file may include a plurality of data blocks, and the backup software may backup only the data blocks that have changed in any of the files in the subset of files corresponding to the backup policy, e.g., without backing up data blocks that have not changed since the previous backup operation was performed. For example, suppose that a particular backup policy is configured to backup the following subset of files: file 1C, file 1E, and file 1H. Suppose that an incremental backup operation for the backup policy is initiated at a time when 100 out of 1000 total data blocks of the file 1C, 50 out of 200 total data blocks of the file 1H, and no data blocks of the file 1E, have changed since the most recent backup operation for the backup policy was performed. Thus, the incremental backup operation may backup the 100 changed data blocks of the file 1C (and none of the 900 unchanged data blocks), the 50 changed data blocks of the file 1H (and none of the 150 unchanged data blocks), and none of the data blocks of the file 1E.

Figure 3:
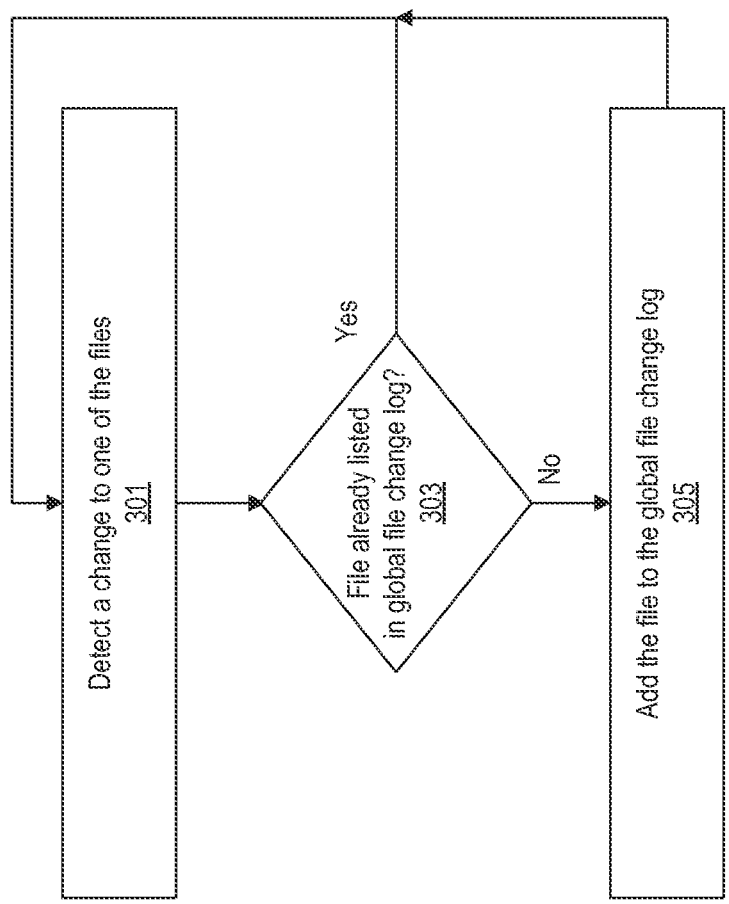
FIG. 3 is a flowchart diagram illustrating one embodiment of a method for maintaining a global file change log.

Thus, the backup software needs to have information specifying which data blocks should be backed up each time a backup operation for a given backup policy is performed. According to some embodiments the system may maintain a global file change log, as shown in the flowchart of FIG. 3. The system may monitor the files 1 to detect changes, e.g., changes caused by write operations to the files. As indicated in blocks 301 and 303, when a change to a particular file is detected, the system may check whether the file is already listed in the global file change log. If not, then the file may be added to the global file change log as indicated in block 305, e.g., by adding its name or other information that identifies the file to the global file change log. In some embodiments the functionality of monitoring for changes to the files and adding the changed files to the global file change log may not be implemented by the backup software 56, but by other software that executes on one or more computers in the system, such as file system software or volume manager software.

Figure 4:
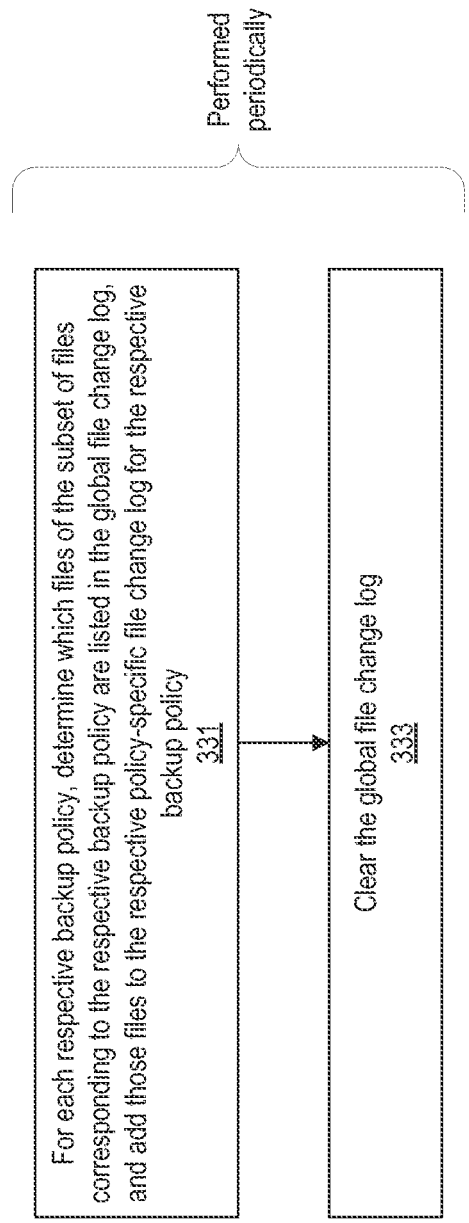
FIG. 4 is a flowchart diagram illustrating one embodiment of a method for processing the global file change log in order to map or distribute the information in the global file change log into respective policy-specific file change logs for each of a plurality of backup policies.

Thus, the global file change log may list all the files in the system that have changed since the global file change log was last cleared. However, a backup operation for any given backup policy does not need to know about all the changed files in the system, but only needs to know which of the subset of files corresponding to that particular backup policy have changed. FIG. 4 is a flowchart diagram illustrating one embodiment of a method for processing the global file change log in order to map or distribute the information in the global file change log into respective policy-specific file change logs for each of the backup policies. The functions illustrated in FIG. 4 may be implemented by the backup software 56 or by other software that operates in conjunction with the backup software 56.

As indicated in block 331, for each respective backup policy that has been configured for the system, the backup software may determine which files of the subset of files corresponding to the respective backup policy are listed in the global file change log, and may add those files to the respective policy-specific file change log for the respective backup policy. After this is done, the global file change log may be cleared as indicated in block 333.

Figure 5:
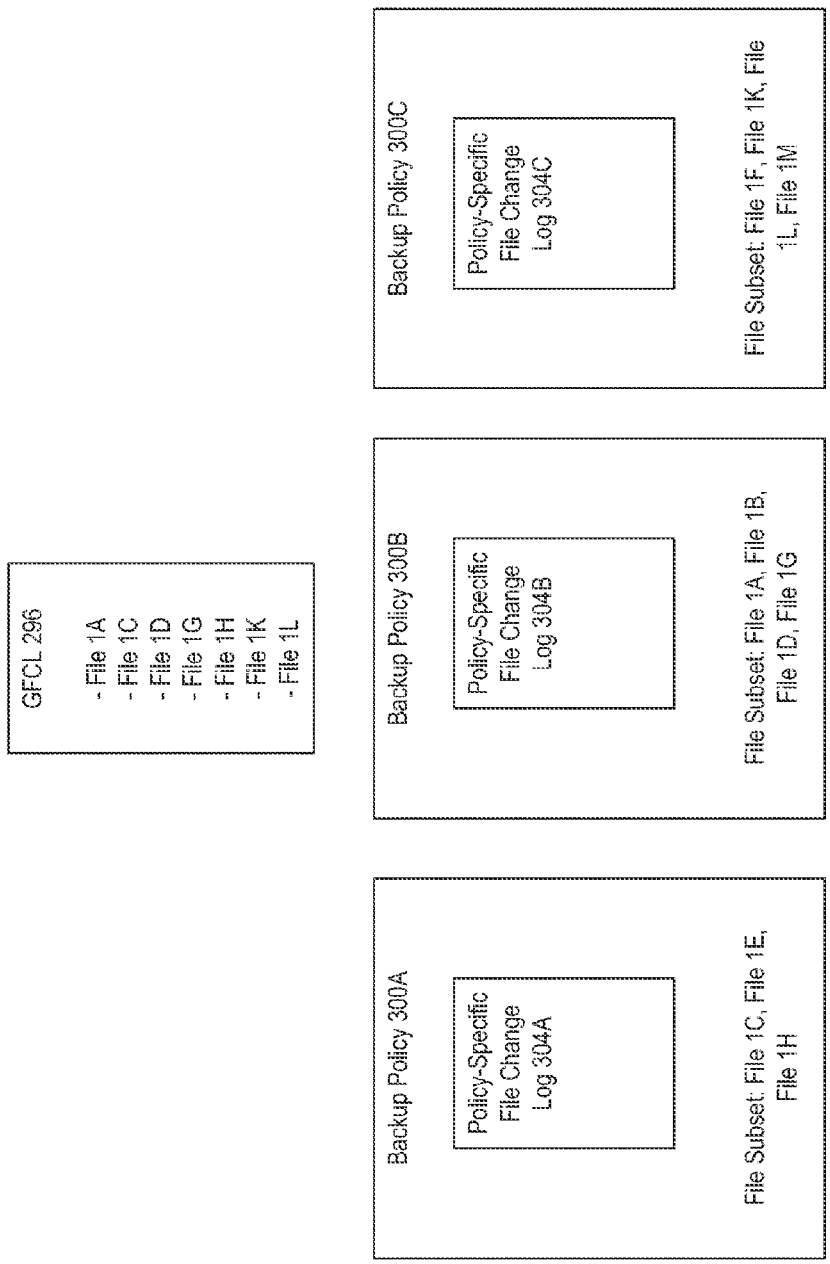
FIGS. 5 and 6 illustrate an example of three backup policies.

For example, FIG. 5 illustrates an example of three backup policies 300A, 300B and 300C. The backup policy 300A is configured to backup the subset of files: file 1C, file 1E, and file 1H. The backup policy 300B is configured to backup the subset of files: file 1A, file 1B, file 1D, and file 1G. The backup policy 300C is configured to backup the subset of files: file 1F, file 1K, file 1L, and file 1M. As shown in FIG. 5, each backup policy may have its own respective policy-specific file change log. For example, the policy-specific file change log 304A is associated with the backup policy 300A, the policy-specific file change log 304B is associated with the backup policy 300B, and the policy-specific file change log 304C is associated with the backup policy 300C.

Figure 6:
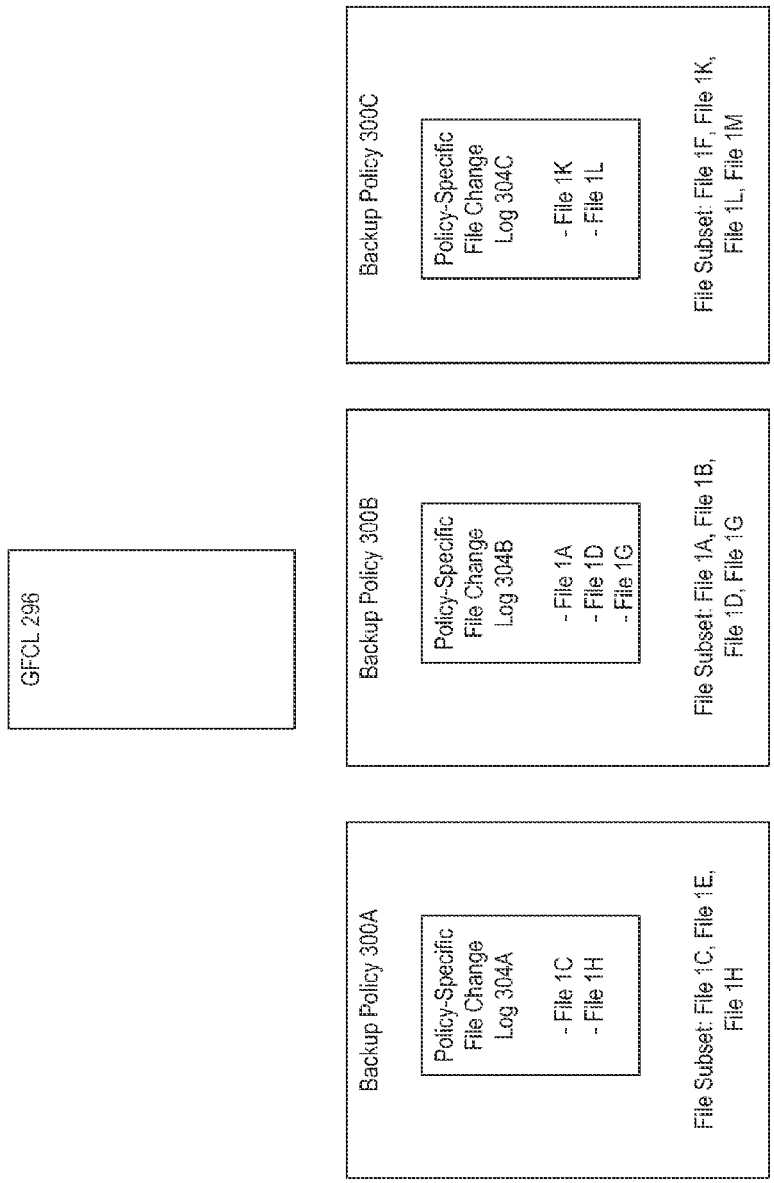

Suppose that at the time when the global file change log 296 is processed, each of the policy-specific file change logs 304 is empty, and the global file change log lists the following files: file 1A, file 1C, file 1D, file 1G, file 1H, file 1K, and file 1L. The global file change log may be processed according to the flowchart of FIG. 4 to result in the information illustrated in FIG. 6. As shown in FIG. 6, the files 1C and 1H have been added to the policy-specific file change log 304A for the backup policy 300A because these files were listed in the global file change log 296 and are in the subset of files corresponding to the backup policy 300A. The file 1E is also in the subset of files corresponding to the backup policy 300A, but it was not added to the policy-specific file change log 304A because the global file change log 296 did not indicate that this file had been changed. Other files that the global file change log indicated had been changed but which are not in the subset of files corresponding to the backup policy 300A (e.g., the files 1A, 1D, 1G, 1K and 1L) were also not added to the policy-specific file change log 304A. The information was distributed from the global file change log 296 into the other policy-specific file change logs similarly so that the policy-specific file change log 304B for the backup policy 300B now lists the files 1A, 1D and 1G, and the policy-specific file change log 304C for the backup policy 300C now lists the files 1K and 1L. Also, the global file change log 296 has now been cleared.

The processing of the global file change log as shown in FIG. 4 may be performed periodically by the backup software so that the policy-specific file change logs for the backup policies are periodically updated so that they list files that have recently been changed. In various embodiments the backup software may be configured to process the global file change log according to any time interval or time schedule. The backup software may provide a user interface that enables an administrator to specify the desired time interval or time schedule.

In various embodiments the backup software may use any algorithm to implement the functionality shown in block 331 of FIG. 4. For example, the backup software may process each file listed in the global file change log by checking whether the file is included in any of the file subsets associated with any of the backup policies. If the backup software finds one or more file subsets in which the file is included, the backup software may add the file to the policy-specific file change log for the corresponding backup policies.

In some embodiments the backup software may be configured to use the policy-specific file change logs 304 to perform file-level incremental backup operations. For example, the backup software may perform a file-level incremental backup operation for the backup policy 300A by backing up all the data blocks of the files 1C and 1H without backing up any of the data blocks of the file 1E since the policy-specific file change log 304A indicates that the files 1C and 1H (and not the file 1E) have changed since the most recent backup operation for the backup policy 300A was performed.

Figure 7:
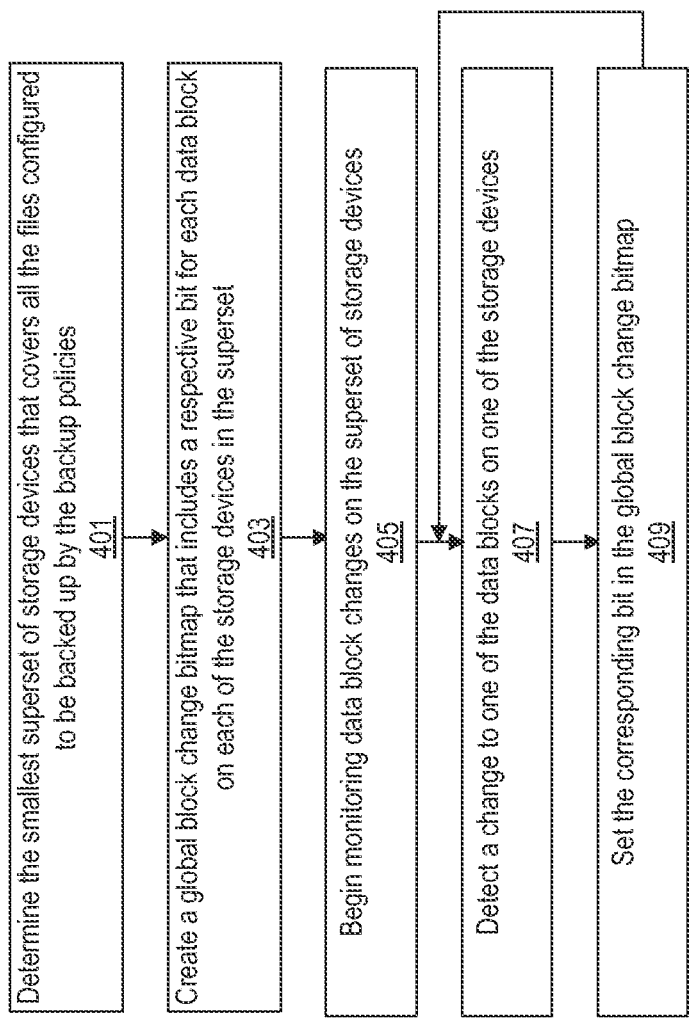
FIG. 7 is a flowchart diagram illustrating one embodiment of a method for maintaining a global block change bitmap.

In further embodiments, it may be desirable to perform block-level incremental backup operations. To facilitate block-level incremental backup operations, the system may maintain a global block change bitmap, as shown in the flowchart of FIG. 7. The system may determine the smallest superset of storage devices that covers all the files configured to be backed up by the backup policies, as indicated in block 401. For example, if the system includes five different storage devices on which files are stored, but no backup policy is configured to backup any of the files stored on two of the storage devices then the superset may include only the other three storage devices. The system may create a global block change bitmap that includes a respective bit for each data block on each of the storage devices in the superset, as indicated in block 403.

The system may then begin monitoring the superset of storage devices to detect changes to any of the data blocks on any of the storage devices, as indicated in block 405. In response to detecting a change to one of the data blocks, the system may set the corresponding bit for that data block in the global block change bitmap, as indicated in blocks 407 and 409.

In some embodiments the functionality of monitoring for changes to the data blocks on the storage devices and setting the corresponding bits for the changed blocks may not be implemented by the backup software 56, but by other software that executes on one or more computers in the system, such as file system software or volume manager software.

Figure 8:
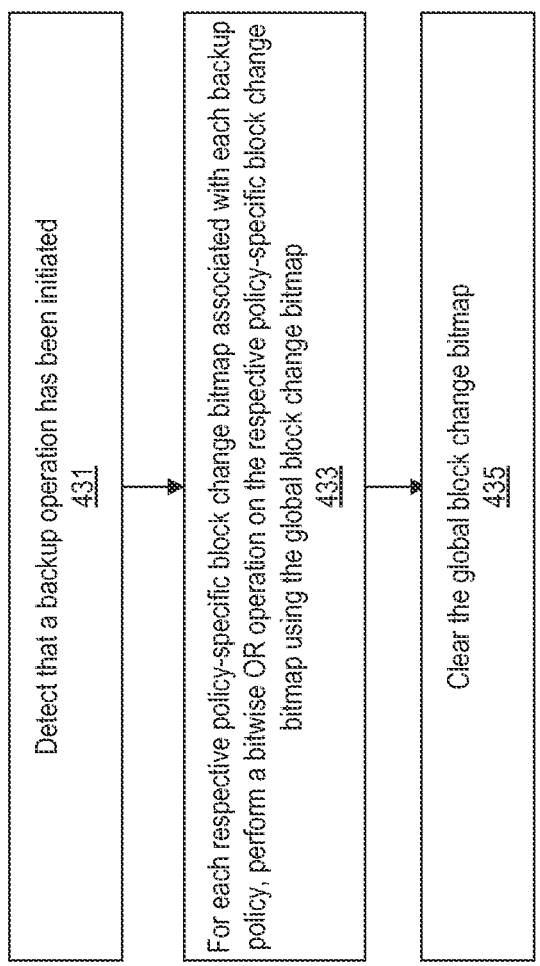
FIG. 8 is a flowchart diagram illustrating one embodiment of a method for mapping or distributing block change information from the global block change bitmap into policy-specific block change bitmaps for the backup policies.

In addition to the global block change bitmap, the system may also maintain a respective policy-specific block change bitmap for each of the backup policies. Similar to the global block change bitmap, each policy-specific block change bitmap may include a respective bit for each data block on each of the storage devices in the superset determined in block 401. FIG. 8 is a flowchart diagram illustrating one embodiment of a method for mapping or distributing the block change information from the global block change bitmap into the policy-specific block change bitmaps for the backup policies. The method of FIG. 8 may be implemented by the backup software or by other software that operates in conjunction with the backup software.

As indicated in block 431, the backup software may detect that a backup operation has been initiated. The backup operation may have been initiated for any of the backup policies. In response to detecting the initiation of the backup operation, the backup software may operate as shown in block 433. For each respective policy-specific block change bitmap associated with each backup policy, the backup software may perform a bitwise OR operation on the respective policy-specific block change bitmap using the global block change bitmap. Thus, for each bit in the global block change bitmap that is set to a "1", the backup software may set the corresponding bit in each of the policy-specific block change bitmaps to a "1" also. If any bits in any of the policy-specific block change bitmaps were already set to a "1" then they may still remain set. After the functionality of block 433 has been performed, the backup software may clear the global block change bitmap as indicated in block 435.

Figure 9:
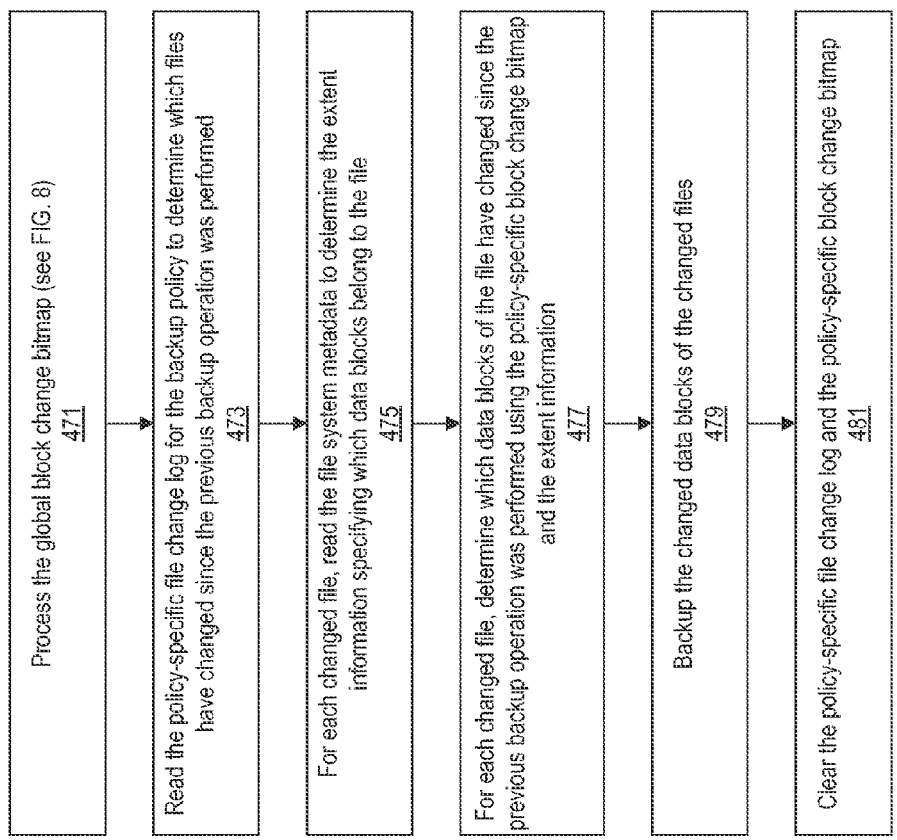
FIG. 9 is a flowchart diagram illustrating one embodiment of a method that uses the policy-specific file change log and the policy-specific block change bitmap for a given backup policy to perform a block-level incremental backup operation for the backup policy.

FIG. 9 is a flowchart diagram illustrating one embodiment of a method that uses the policy-specific file change log and the policy-specific block change bitmap for a given backup policy to perform a block-level incremental backup operation for the backup policy. The method may be implemented by the backup software.

As indicated in block 471, the backup software may process the global block change bitmap as described above with reference to FIG. 8. The backup software may then read the policy-specific file change log for the backup policy to determine which files in the subset of files corresponding to the backup policy have changed since the previous backup operation was performed. For each changed file, the backup software may read the file system metadata for the file to determine the extent information specifying which data blocks belong to the file, as indicated in block 475. For each changed file, the backup software may determine which data blocks of the file have changed since the previous backup operation was performed. For example, if the extent information for a given changed file specifies that a particular data block belongs to the file then the backup software may check the policy-specific block change bitmap for the backup policy to determine whether the bit corresponding to that data block is set to a "1". If so then this indicates that the data block has changed since the last backup operation for the backup policy was performed, and thus the data block may be added to a list of changed data blocks to backup. Otherwise, if the corresponding bit is not set in the policy-specific block change bitmap then this indicates that the data block does not need to be backed up since it has not changed since the last backup operation for the backup policy was performed.

As indicated in block 479, the backup software may backup the changed data blocks of the changed data blocks that were determined in block 477. For example, each of the changed data blocks may be copied into a backup image stored on the backup storage device.

The backup software may also clear the policy-specific file change log and the policy-specific block change bitmap for the backup policy as indicated in block 481. For example, the policy-specific file change log may be cleared by deleting the information it contains or by deleting a file or data structure that stores the policy-specific file change log. The policy-specific block change bitmap may be cleared by resetting all its bits to "0" or by deleting a file or data structure that stores the policy-specific block change bitmap.

The policy-specific file change log for each backup policy may be implemented using one or more log files. In some embodiments, the policy-specific file change log for a given backup policy may have multiple log files. For example, each time the global file change log is processed as described above with reference to FIG. 4, a new policy-specific file change log file may be created for each affected backup policy. Thus, if the global file change log is processed multiple times between different backup operations for a given backup policy then multiple policy-specific file change log files may be created for that backup policy. When the next backup operation for the backup policy is performed, each of the policy-specific file change log files for the backup policy may be processed similarly as described above with reference to FIG. 9, and the policy-specific file change log files may then be deleted.

In some embodiments the backup software may use a naming convention for the policy-specific file change log files to avoid conflicts. For example, when one task of the backup software is currently processing the global file change log and distributing file change information from there into the policy-specific file change log for a given backup policy, the task may create the policy-specific file change log according to the name:

flist.<incomplete>.<timestamp>

If another task of the backup software needs to process the global file change log, the task may first check whether the global file change log is already open to ensure that another information distribution task is not already processing the FCL log file. Once the first task has finished processing the global file change log, the task may delete the global file change log rename each of the policy-specific file change logs for the backup policies to indicate that they are now complete, e.g., by renaming them from:

flist.<incomplete>.<timestamp> to:

flist.<complete>.<timestamp>

In some embodiments, when a backup operation executes for a given backup policy, the backup operation may set a read lock on all the policy-specific file change logs for that backup policy. Once the data has been backed up, the backup operation may close each file, and if there is no read lock set on that file, the file may be deleted. If a read lock is set on the file then the backup operation may not delete the file since some other backup operation might be reading the file.

Various embodiments of the system and method described above may address several challenging issues in the problem of how to enable backup operations for particular backup policies to determine which data blocks should be backed up. For example, the global file change log information may be periodically distributed into policy-specific file change logs for the individual backup policies prior to the backup operations for the backup policies actually running. This may reduce the amount of time required for each backup operation to run since most of the file-level change information is already available when the backup operation is initiated.

Also, even if a particular set of backup files is shared by multiple backup policies, there will not be any conflict when deleting the policy-specific file change log for one of the backup policies since the other backup policies have their own respective policy-specific file change logs. Also, the global file change log information can be purged after distributing it into the policy-specific file change logs for the individual backup policies.

Figure 10:
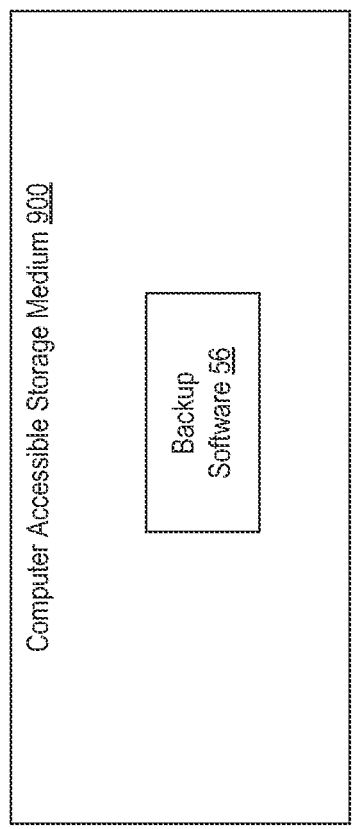
FIG. 10 is a block diagram illustrating a computer accessible storage medium.

Turning now to FIG. 10, a block diagram of a computer accessible storage medium 900 is shown. The computer accessible storage medium 900 may store program instructions executable by one or more processors to implement various functions described above, such as program instructions associated with the backup software 56. Generally speaking, the computer accessible storage medium 900 may store any set of instructions which, when executed, implement a portion or all of the functions described above.

A computer accessible storage medium may include any storage media accessible by one or more computers during use to provide instructions and/or data to the computer(s). For example, a computer accessible storage medium may include storage media such as magnetic or optical media, e.g., one or more disks (fixed or removable), tapes, CD-ROMs, DVD-ROMs, CD-Rs, CD-RWs, DVD-Rs, DVD-RWs, or Blu-Ray disks. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, a flash memory interface (FMI), a serial peripheral interface (SPI), etc. Storage media may include microelectromechanical systems (MEMS), as well as storage media accessible via a communication medium such as a network and/or a wireless link. A carrier medium may include computer accessible storage media as well as transmission media such as wired or wireless transmission.

Although the above description discusses various functions that may be performed by the backup software 56 executing on the backup server computer 102, it is noted that in alternative embodiments the functions may be performed by software executing on a computer other than the backup server computer 102, or on multiple computer systems.

Numerous variations and modifications will become apparent to those skilled in the art once the above disclosure is fully appreciated. It is intended that the following claims be interpreted to embrace all such variations and modifications.

What is claimed is:

1. A non-transitory, computer-accessible storage medium storing program instructions executable by one or more processors to:
   for each respective backup policy of a plurality of backup policies, configure the respective backup policy with information specifying a respective subset of a plurality of files to be backed up;
   in response to changes to the plurality of files, maintain a global file change log that lists which files of the plurality of files have been changed;
   process the global file change log, wherein in processing the global file change log, the program instructions are executable to:
      for each respective backup policy of the plurality of backup policies, determine which particular files of the respective subset of files corresponding to the respective backup policy are listed in the global file change log, and add the particular files to a respective policy-specific file change log for the respective backup policy; and
      clear the global file change log;
   wherein the program instructions are further executable by the one or more processors to perform a respective backup operation for each respective backup policy, wherein in performing the respective backup operation for each respective backup policy, the program instructions are executable by the one or more processors to backup the files listed in the respective policy-specific file change log for the respective backup policy;
   wherein after performing the respective backup operation for each respective backup policy, the program instructions are further executable by the one or more processors to clear the respective policy-specific file change log for the respective backup policy.

2. The non-transitory, computer-accessible storage medium of claim 1,
   wherein the program instructions are further executable by the one or more processors to periodically perform said processing the global file change log.

3. The non-transitory, computer-accessible storage medium of claim 1, wherein the program instructions are further executable by the one or more processors to:
   in response to changes to the plurality of files, maintain a global block change bitmap that indicates which data blocks of the plurality of files have been changed; and
   for each respective backup policy of the plurality of backup policies, update a respective policy-specific block change bitmap using the global block change bitmap;
   wherein in performing the respective backup operation for each respective backup policy, the program instructions are executable by the one or more processors to backup only the data blocks that have changed in the files listed in the respective policy-specific file change log since a previous backup operation for the respective backup policy was performed, wherein the data blocks that have changed are specified in the respective policy-specific block change bitmap for the respective backup policy.

4. The non-transitory, computer-accessible storage medium of claim 3,
   wherein in updating the respective policy-specific block change bitmap for each respective backup policy, the program instructions are executable by the one or more processors to perform a bitwise OR operation on the respective policy-specific block change bitmap using the global block change bitmap.

5. The non-transitory, computer-accessible storage medium of claim 3,
   wherein after performing the respective backup operation for each respective backup policy, the program instructions are further executable by the one or more processors to clear the respective policy-specific block change bitmap for the respective backup policy.

6. The non-transitory, computer-accessible storage medium of claim 3,
   wherein the program instructions are executable by the one or more processors to update the policy-specific block change bitmaps for the backup policies in response to determining that a backup operation for one of the backup policies has been initiated.

7. The non-transitory, computer-accessible storage medium of claim 3,
   wherein the program instructions are further executable by the one or more processors to clear the global block change bitmap after updating the policy-specific block change bitmaps for the backup policies.

8. A system comprising:

one or more processors; and memory storing program instructions, wherein the program instructions are executable by the one or more processors to:

for each respective backup policy of a plurality of backup policies, configure the respective backup policy with information specifying a respective subset of a plurality of files to be backed up;

in response to changes to the plurality of files, maintain a global file change log that lists which files of the plurality of files have been changed;

process the global file change log, wherein in processing the global file change log, the program instructions are executable to:

for each respective backup policy of the plurality of backup policies, determine which particular files of the respective subset of files corresponding to the respective backup policy are listed in the global file change log, and add the particular files to a respective policy-specific file change log for the respective backup policy; and clear the global file change log;

wherein the program instructions are further executable by the one or more processors to perform a respective backup operation for each respective backup policy, wherein in performing the respective backup operation for each respective backup policy, the program instructions are executable by the one or more processors to backup the files listed in the respective policy-specific file change log for the respective backup policy;

wherein after performing the respective backup operation for each respective backup policy, the program instructions are further executable by the one or more processors to clear the respective policy-specific file change log for the respective backup policy.

9. The system of claim 8, wherein the program instructions are further executable by the one or more processors to periodically perform said processing the global file change log.

10. The system of claim 8, wherein the program instructions are further executable by the one or more processors to:

in response to changes to the plurality of files, maintain a global block change bitmap that indicates which data blocks of the plurality of files have been changed; and for each respective backup policy of the plurality of backup policies, update a respective policy-specific block change bitmap using the global block change bitmap;

wherein in performing the respective backup operation for each respective backup policy, the program instructions are executable by the one or more processors to backup only the data blocks that have changed in the files listed in the respective policy-specific file change log since a previous backup operation for the respective backup policy was performed, wherein the data blocks that have changed are specified in the respective policy-specific block change bitmap for the respective backup policy.

11. The system of claim 10, wherein in updating the respective policy-specific block change bitmap for each respective backup policy, the program instructions are executable by the one or more processors to perform a bitwise OR operation on the respective policy-specific block change bitmap using the global block change bitmap.

12. The system of claim 10, wherein after performing the respective backup operation for each respective backup policy, the program instructions are further executable by the one or more processors to clear the respective policy-specific block change bitmap for the respective backup policy.

13. The system of claim 10, wherein the program instructions are executable by the one or more processors to update the policy-specific block change bitmaps for the backup policies in response to determining that a backup operation for one of the backup policies has been initiated.

14. The system of claim 10, wherein the program instructions are further executable by the one or more processors to clear the global block change bitmap after updating the policy-specific block change bitmaps for the backup policies.

15. A method comprising:

for each respective backup policy of a plurality of backup policies, configuring the respective backup policy with information specifying a respective subset of a plurality of files to be backed up;

in response to changes to the plurality of files, maintaining a global file change log that lists which files of the plurality of files have been changed;

processing the global file change log, wherein processing the global file change log includes:

for each respective backup policy of the plurality of backup policies, determining which particular files of the respective subset of files corresponding to the respective backup policy are listed in the global file change log, and adding the particular files to a respective policy-specific file change log for the respective backup policy; and clearing the global file change log;

wherein the method further comprises performing a respective backup operation for each respective backup policy, wherein performing the respective backup operation for each respective backup policy includes backing up the files listed in the respective policy-specific file change log for the respective backup policy; and after performing the respective backup operation for each respective backup policy, clearing the respective policy-specific file change log for the respective backup policy.

16. The method of claim 15, further comprising:

in response to changes to the plurality of files, maintaining a global block change bitmap that indicates which data blocks of the plurality of files have been changed; and for each respective backup policy of the plurality of backup policies, updating a respective policy-specific block change bitmap using the global block change bitmap;

wherein performing the respective backup operation for each respective backup policy includes backing up only the data blocks that have changed in the files listed in the respective policy-specific file change log since a previous backup operation for the respective backup policy was performed, wherein the data blocks that have changed are specified in the respective policy-specific block change bitmap for the respective backup policy.

* * * * *